United States Patent
Hou

(10) Patent No.: US 12,026,503 B2
(45) Date of Patent: Jul. 2, 2024

(54) DEVICE OF UPDATING LIBRARY REQUIRED BY TESTING PROGRAM FOR TESTING AND METHOD THEREOF

(71) Applicants: Inventec (Pudong) Technology Corporation, Shanghai (CN); Inventec Corporation, Taipei (TW)

(72) Inventor: Lin Hou, Shanghai (CN)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 141 days.

(21) Appl. No.: 17/849,374

(22) Filed: Jun. 24, 2022

(65) Prior Publication Data

US 2023/0409309 A1    Dec. 21, 2023

(30) Foreign Application Priority Data

Jun. 17, 2022  (CN) .......................... 202210689580.4

(51) Int. Cl.
    *G06F 9/44*      (2018.01)
    *G06F 8/65*      (2018.01)
    *G06F 11/36*     (2006.01)

(52) U.S. Cl.
    CPC .............. *G06F 8/65* (2013.01); *G06F 11/368* (2013.01); *G06F 11/3688* (2013.01)

(58) Field of Classification Search
    None
    See application file for complete search history.

(56) References Cited

U.S. PATENT DOCUMENTS

| | | | | |
|---|---|---|---|---|
| 7,549,042 B2 * | 6/2009 | Glaum | ..................... | G06F 8/658 713/1 |
| 8,839,224 B2 * | 9/2014 | Adler | ....................... | H04L 67/10 717/178 |
| 9,197,663 B1 * | 11/2015 | Gilbert | ................ | G06F 3/04817 |
| 2003/0191870 A1 * | 10/2003 | Duggan | ................ | G06F 9/4488 719/331 |
| 2004/0215755 A1 * | 10/2004 | O'Neill | ................... | G06F 8/658 717/170 |
| 2009/0199047 A1 * | 8/2009 | Vaitheeswaran | .... | G06F 11/3672 714/E11.179 |
| 2013/0151686 A1 * | 6/2013 | Takaoka | .............. | H04L 41/0816 709/223 |
| 2016/0154055 A1 * | 6/2016 | Leibowitz | .......... | G01R 31/2874 324/762.03 |

\* cited by examiner

*Primary Examiner* — Wei Y Zhen
*Assistant Examiner* — Lanny N Ung
(74) *Attorney, Agent, or Firm* — David R. Stevens; Stevens Law Group

(57) ABSTRACT

A device of updating library required by a testing program for testing and a method thereof are disclosed. A system configuration file of an old testing device is modified to make the old testing device enter a testing mode when booting, so that library supporting the testing program of an application is updated in the testing mode; when the application is executed, the testing program is connected to the to-be-tested device for performing testing, so that the old testing device can be updated through network without dedicated hardware, and the technical effect of reducing the time and labor cost for updating the old testing device can be achieved.

8 Claims, 5 Drawing Sheets

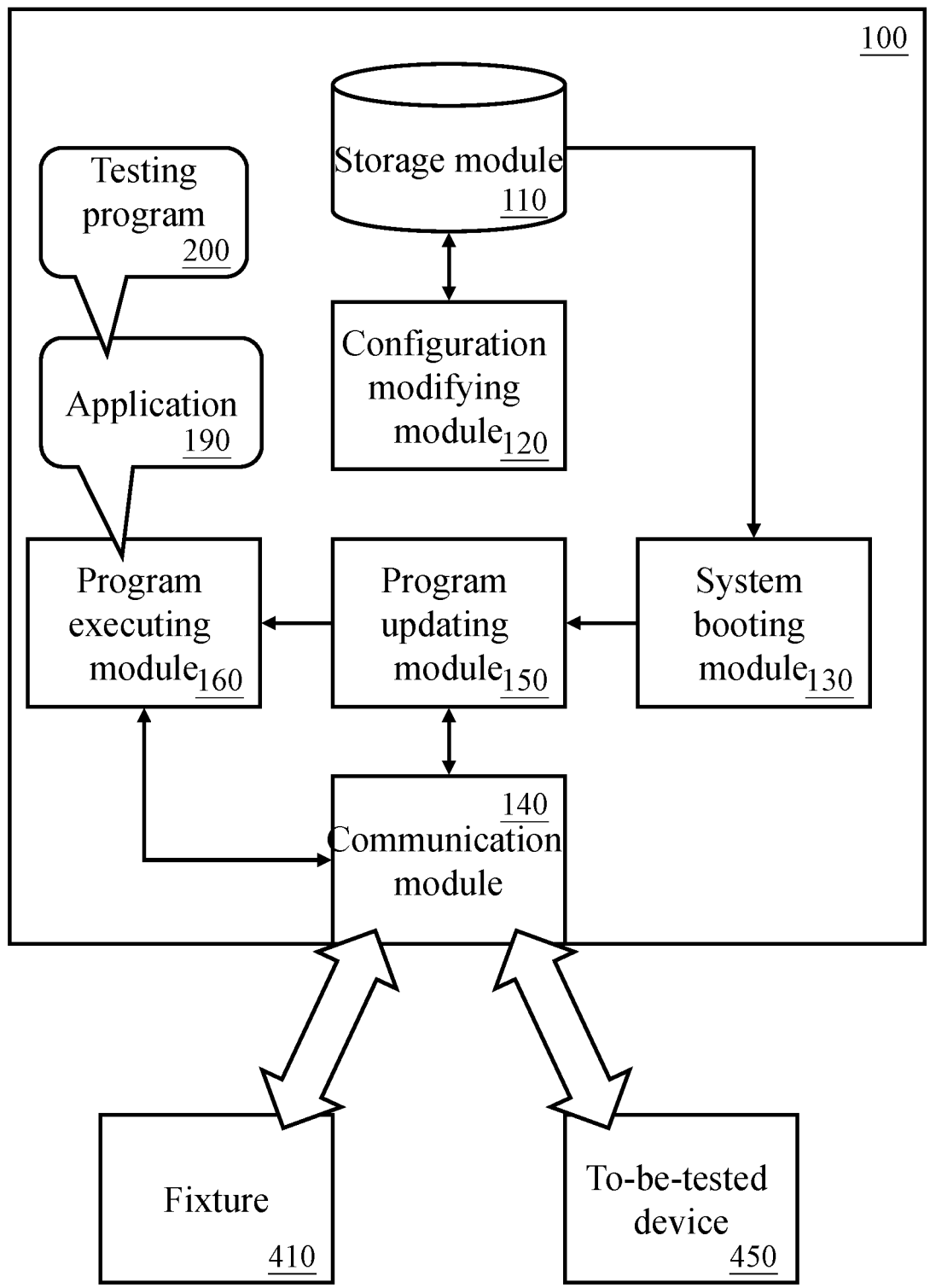
【Fig. 1】

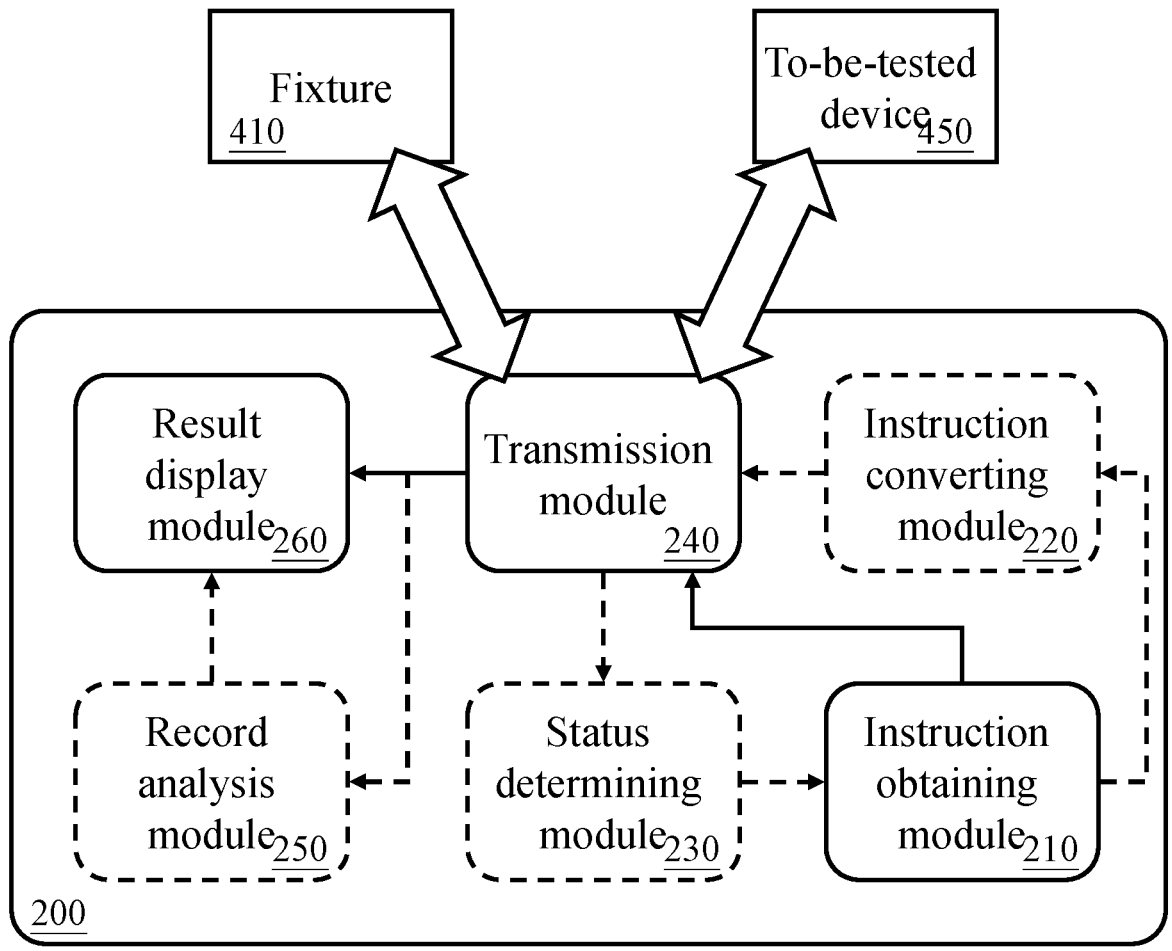
[Fig. 2]

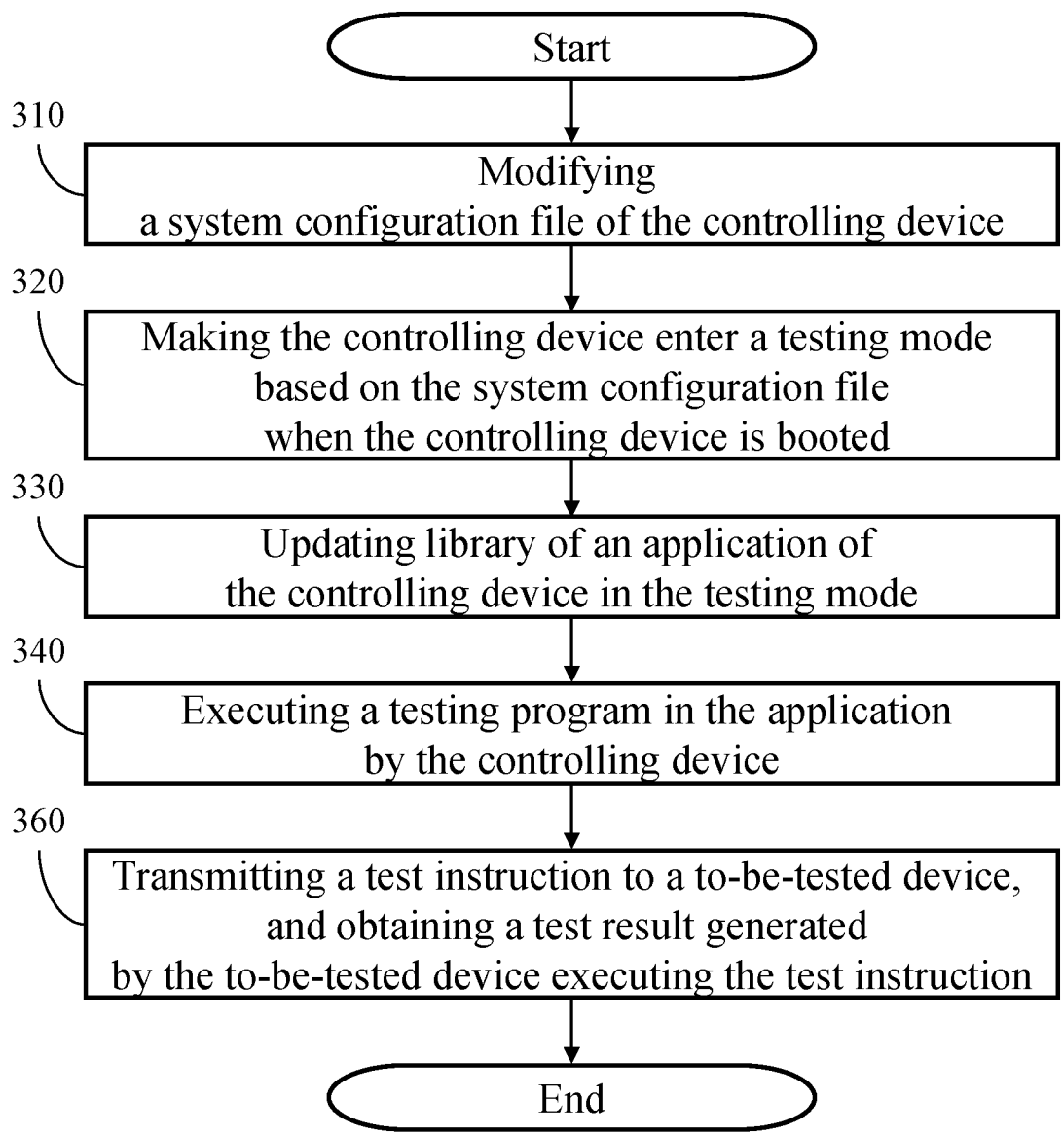
[Fig. 3A]

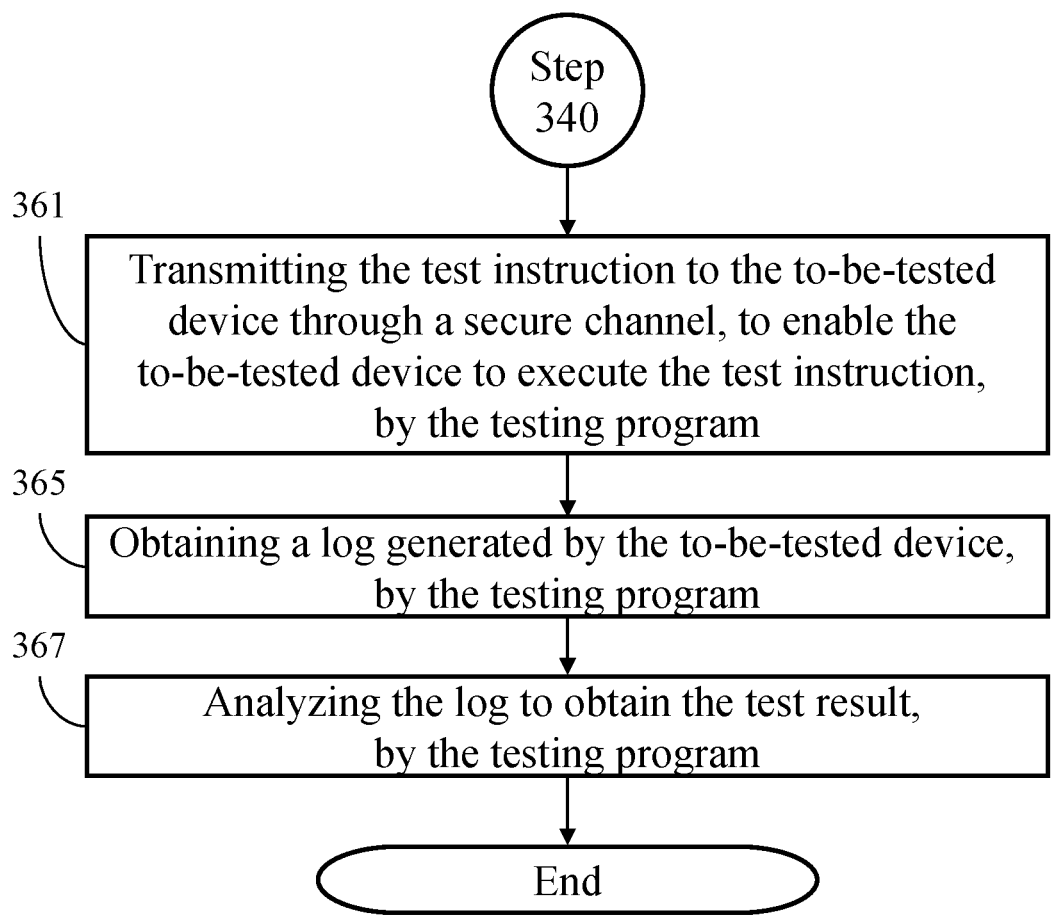
[Fig. 3B]

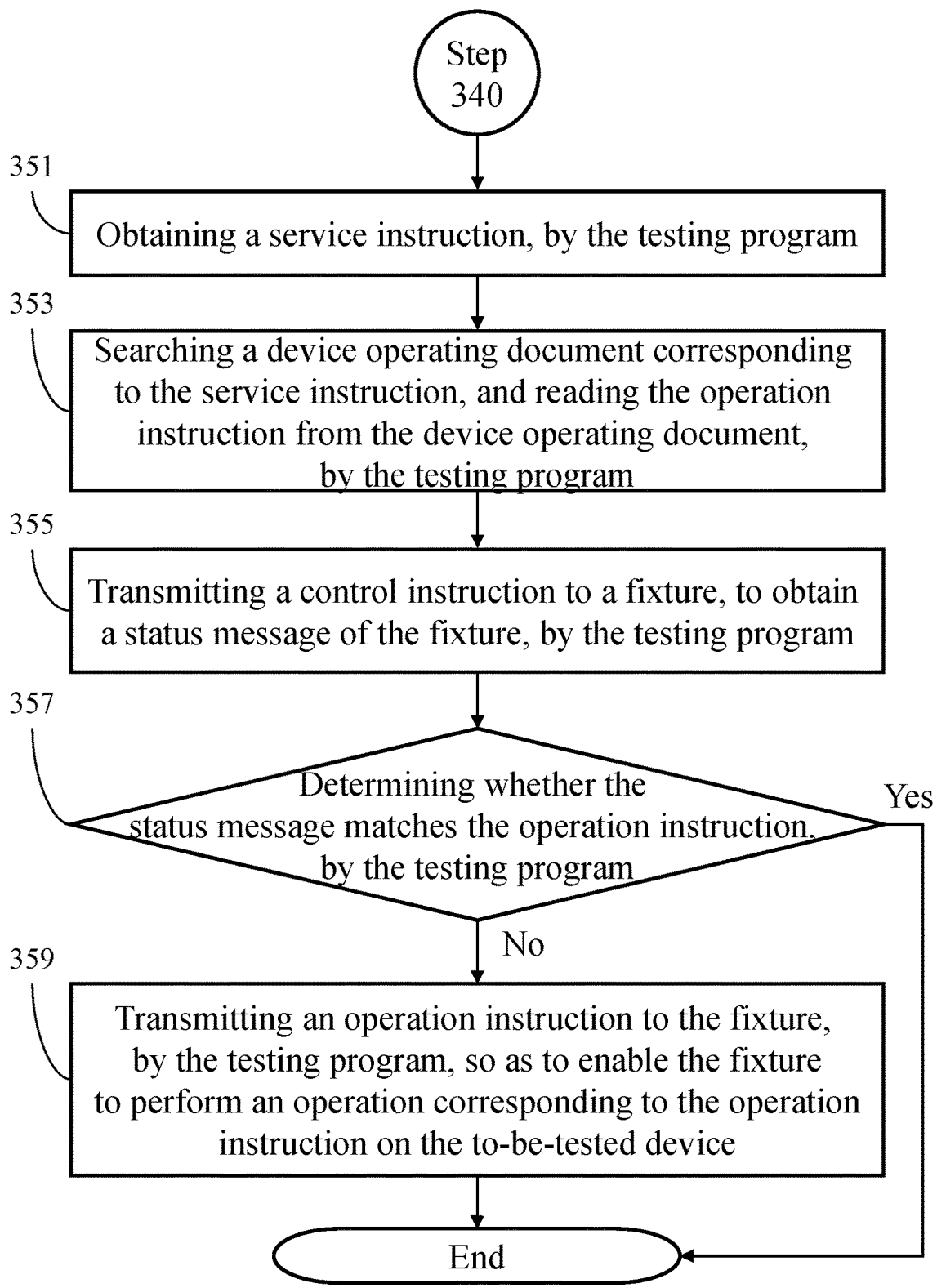
[Fig. 3C]

DEVICE OF UPDATING LIBRARY REQUIRED BY TESTING PROGRAM FOR TESTING AND METHOD THEREOF

CROSS-REFERENCE TO RELATED APPLICATION

This application claims the benefit of Chinese Application Serial No. 202210689580.4, filed Jun. 17, 2022, which is hereby incorporated herein by reference in its entirety.

BACKGROUND OF THE INVENTION

1. Field of the Invention

The present invention relates to a testing device and a method thereof, and more particular to a device of updating library required by a testing program for testing and a method thereof.

2. Description of the Related Art

Industry 4.0 (also known as the fourth industrial revolution) is not just creation of new industrial technologies, but focuses on the integration of existing industrial technologies, sales processes and product experience, so as to build a smart factory with adaptability, resource efficiency and ergonomics through artificial intelligence (AI) technology, and integrate customers and business partners in the business process and value process to provide perfect after-sales service, thereby establishing a new intelligent industrial world with perception consciousness.

With the wave of the Industry 4.0 sweeping the world, manufacturers are all using smart manufacturing to optimize production transformation and enhance competitiveness. The smart manufacturing is to realize the intelligent product design, manufacturing, and enterprise management and service based on sensing technology, network technology, automation technology and AI through the processes of perception, human-computer interaction, decision-making, execution and feedback.

The electronic assembly industry has characteristics of small profits but quick turnover and fierce product price competition, so the manufacturers in the electronic assembly industry always pursue more effective control and optimization of raw materials and production tools, thereby maximizing the efficiency of factory production resources. For example, the production line of the electronic assembly industry includes many test stages.

In some factories in the electronic assembly industry, special testing devices are used to test the manufactured products, and most of these special testing devices are optimized for the products to be tested; however, with the passage of time, the versions of applications installed in these special testing devices are getting older, so that these special testing devices may not be directly reused in other testing environment, and when production of the products tested by these special testing device is ceased, these special testing devices are hardly used.

Some testers try to directly update the firmware of the dedicated testing devices, but the design of the dedicated c usually does not include the function of firmware update or replacement, so the testers need to disassemble the dedicated testing device first, and then manually replace the firmware of the dedicated hardware after the case of the dedicated testing device is removed.

According to above-mentioned contents, what is needed is to develop an improved solution to solve the conventional problem of extra time cost to update the firmware of the old dedicated testing device with special hardware to reuse the old dedicated testing device.

SUMMARY OF THE INVENTION

An objective of the present invention is to provide a device of updating library required by testing program for testing and method, to solve the conventional problem of extra time cost to update the firmware of an old dedicated testing device with special hardware to reuse the old dedicated testing device.

In order to achieve the objective, the present invention provides a device of updating library required by testing program for testing, and the device includes a storage module, a configuration modifying module, a system booting module, a program updating module and a program executing module. The storage module is configured to store a system configuration file. The configuration modifying module is configured to modify the system configuration file. The system booting module is configured to boot the device based on the system configuration file, to make the device enter a testing mode. When the device enters the testing mode, the program updating module is configured to update library of an application. The program executing module is configured to execute the application in the testing program, wherein the testing program transmits a test instruction to a to-be-tested device and obtains a test result generated by the to-be-tested device executing the test instruction.

In order to achieve the objective, the present invention provides a method of updating library required by a testing program for testing, the method is applicable to a controlling device and includes steps of: modifying a system configuration file of the controlling device; making the controlling device enter a testing mode based on the system configuration file when the controlling device is booted; updating library of an application of the controlling device in the testing mode; after the library is updated, executing a testing program in the application by the controlling device; transmitting a test instruction to a to-be-tested device, and obtaining a test result generated by the to-be-tested device executing the test instruction, by the testing program.

According to the above-mentioned device and method of the present invention, the difference between the present invention and the conventional technology is that, in the present invention, the system configuration file of an old testing device is modified to make the old testing device enter the testing mode when booting, so that library supporting the testing program of the application is updated in the testing mode; when the application is executed, the testing program is connected to the to-be-tested device for performing testing, so that the conventional problem can be solved and the technical effect of reducing the time and labor cost for updating the old testing device can be achieved.

BRIEF DESCRIPTION OF THE DRAWINGS

The structure, operating principle and effects of the present invention will be described in detail by way of various embodiments which are illustrated in the accompanying drawings.

FIG. 1 is a schematic view of components of a device of updating library required by a testing program for testing, according to the present invention.

FIG. 2 is a schematic view of components of a testing program, according to the present invention.

FIG. 3A is a flowchart of a method of updating library required by a testing program for testing, according to the present invention.

FIG. 3B is a flowchart of perform testing on a to-be-tested device by a testing program, according to the present invention.

FIG. 3C is a flowchart of controlling a fixture by a testing program, according to the present invention.

DETAILED DESCRIPTION OF THE
PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The present invention is able to update library of an application originally installed in an old testing device, to enable the old testing device to execute a testing program in the updated application, so as to perform testing on the to-be-tested device through the testing program.

The operation of the device 100 of the present invention is described in the following paragraphs with reference to FIG. 1, which is a schematic view of components of a device of updating library required by a test program for testing, according to the present invention. As shown in FIG. 1, a device 100 of the present invention includes a storage module 110, a configuration modifying module 120, a system booting module 130, a communication module 140, a program updating module 150 and a program executing module 160. In an embodiment, the device 100 is usually a computing device.

The storage module 110 is configured to store a system configuration file and a resource configuration file.

The configuration modifying module 120 is configured to modify the system configuration file stored in the storage module 110, to adjust an execution mode of the device 100 after the device 100 is booted; in an embodiment, an automatic sleep mechanism of the device 100 can be enabled or disabled based on the modified system configuration file. The configuration modifying module 120 modifies the resource configuration file stored in the storage module 110, to display a hot key on a user interface after the device 100 is booted. The displayed hot key can trigger a specific function. In an embodiment, the hot key can be displayed in the form of a link, an icon or a button, but the present disclosure is not limited to these examples.

The configuration modifying module 120 reads at least one of the system configuration file and the resource configuration file from the storage module 110, and modifies the read system configuration file/resource configuration file. The storage module 110 then overwrites the original system configuration file/resource configuration file by the modified system configuration file/resource configuration file.

The system booting module 130 is configured to boot the device 100 based on the system configuration file stored in the storage module 110, so that the device 100 enters the execution mode set in the system configuration file. The execution mode can be, for example, an original mode of the device 100 or a testing mode added by modifying the system configuration file.

In an embodiment, after the device 100 is booted completely, the system booting module 130 disables the automatic sleep mechanism of the device 100 to prevent the device 100 from triggering the automatic sleep mechanism to interrupt the testing process during the process of testing the to-be-tested device 450. For example, the system booting module 130 disables the automatic sleep mechanism of the device 100 based on the setting value recorded in the system configuration file stored in the storage module 110, or executes a system instruction of disabling the automatic sleep mechanism.

The communication module 140 is connected to the fixture 410 and the to-be-tested device 450 through wired or wireless communication technology, to transmit/receive data or signal to/from at least one of the fixture 410 and the to-be-tested device 450.

When the device 100 enters the testing mode, the program updating module 150 updates the library (not shown in figures) supporting the testing program 200 of the application 190. In more detail, the program updating module 150 first obtains a version message of the library related to the testing program 200 in the application 190 and determines, based on the version recorded in the version message, whether the library of the application 190 supports the testing program 200. When the version of the library is new enough to support the testing program 200, the operation of the program updating module 150 is stopped; when the library is too old to support the testing program 200, the program updating module 150 is connected to an external file server (not shown in figures) through the communication module 140, to download the library supporting the testing program 200. In an embodiment, the program updating module 150 resets the device 100 after the library is completely downloaded and/or installed. The library downloaded by the program update module 150 may be compressed and/or encrypted, the program update module 150 may also decompress and/or decrypt the downloaded library, and the program update module 150 may also verify the correctness and completeness of the downloaded library.

When the device 100 enters the testing mode, the program executing module 160 installs the testing program 200 in the application 190 and executes the launch instruction of the client of the testing program 200, so as to enable the testing program 200 to be executed in the device 100 under the application 190.

The testing program 200 transmits a test instruction to the to-be-tested device 450 in the application 190 and displays a test result generated by the to-be-tested device 450 executing the test instruction on the application 190. As shown in FIG. 2, the testing program 200 includes an instruction obtaining module 210, a transmission module 240, a result display module 260, an instruction converting module 220, a status determining module 230 and a record analysis module 250. It should be noted that the instruction converting module 220, the status determining module 230 and the record analysis module 250 are optional modules.

The instruction obtaining module 210 obtains the test instruction; in general, the test instruction is preset by a user, but the present invention is not limited thereto, for example, the instruction obtaining module 210 can provide an instruction input interface for the user to input the test instruction. It is to be noted that the test instruction obtained by the instruction obtaining module 210 can be an instruction or a series of instructions, but the present invention is not limited to the examples.

The instruction obtaining module 210 obtains a service instruction generated by the device 100 when being operated by the user. For example, when the to-be-tested device 450 does not launch the operating system successfully, the user can click the hot key displayed on a user interface of the device 100, to generate the corresponding service instruction based on the resource configuration file stored in the storage module 110.

The instruction converting module 220 converts the service instruction generated by the instruction obtaining module 210, to an operation instruction. In an embodiment, the instruction converting module 220 can search a file name and path of a device operating document corresponding to the fixture 410 from a setting file of the testing program 200, for example, the instruction converting module 220 can search for device identification data representing the fixture 410 and read the path and file name behind the device identification data, but the present invention is not limited to. After opening the device operating document based on the file name and path, the instruction converting module 220 reads the operation instruction(s) corresponding to instruction identification data of the generated service instruction from the opened device operating document. The setting file of the testing program 200 is a file maintained by testers, such as "setting j son".

The status determining module 230 determines whether, the status message received by the transmission module 240 matches the operation instruction generated by the instruction converting module 220. In more detail, the status determining module 230 can determine whether the relative relationship between the fixture 410 and the to-be-tested device 450 indicated by the state information and the relative relationship between the fixture 410 and the to-be-tested device 450 after the fixture 410 completes the operation instruction are the same. The relative relationship includes, but is not limited to, the fixture 410 grips or engages the to-be-tested device 450, the fixture 410 releases or disengages the to-be-tested device 450, the fixture 410 moves out of the to-be-tested device 450, and the like.

The transmission module 240 is connected to the to-be-tested device 450 through a communication module 140, so as to transmit/receive data or signal to/from the to-be-tested device 450. In an embodiment, the transmission module 240 can be connected to the to-be-tested device 450 through a secure channel such as SSH, but the present invention is not limited to the example.

The transmission module 240 transmits the test instruction obtained by the instruction obtaining module 210 to the to-be-tested device 450, to enable the to-be-tested device 450 to execute the test instruction. For example, when the testing program 200 is written in python language, the transmission module 240 executes the test instruction in the to-be-tested device 450 by calling a function such as exec_command( ).

The transmission module 240 receives a test result or a log generated by the to-be-tested device 450, through the communication module 140. The transmission module 240 downloads the test result or the log from the predetermined storage location of the to-be-tested device 450, or receives the test result or the log generated and transmitted by the to-be-tested device 450.

In an embodiment, the transmission module 240 can be connected to the fixture 410 through the communication module 140, so as to transmit/receive data or signal to/from the fixture 410. For example, the transmission module 240 transmits the control instruction obtained by the instruction obtaining module 210 to the fixture 410, and receive the status message transmitted from the fixture 410. When the status determining module 230 determines that the status message does not match the operation instruction generated by the instruction converting module 220, the transmission module 240 transmits the operation instruction to the fixture 410, to enable the fixture 410 to perform an operation corresponding to the operation instruction on the to-be-tested device 450, for example, the operation of releasing or disengaging the to-be-tested device 450 from the fixture 410, or removing out of the to-be-tested device 450 from the fixture 410.

The record analysis module 250 analyzes the log that is generated by the to-be-tested device 450 and received by the transmission module 240, to generate the test result. For example, the record analysis module 250 can determine the format of the log according to each test instruction obtained by the command obtaining module 210, and extract the required data from the log according to the determined format. The content is used to generate the test results, but the present invention is not limited to the above.

The result display module 260 displays the test result that is received by the transmission module 240 or generated by the record analysis module 250, in the application The operation of the device and method of the present invention is described in the following paragraphs with reference to an embodiment. Please refer to FIG. 3A, which is a flowchart of a method of updating library required by a test program for testing, according to the present invention. In this embodiment, the device 100 is a controlling device and the application is a browser.

In a step 310, a tester modifies the system configuration file stored in the storage module 110 of the device 100 through the configuration modifying module 120 of the device 100. In this embodiment, the device 100 uses an operating system of Unix-Like, the tester can modify the system configuration file "/etc/profile" to set the device 100 to enter a testing mode in next booting.

In a step 320, when the system configuration file stored in the storage module 110 of the device 100 is modified and the device 100 is rebooted, the system booting module 130 of the device 100 loads the modified system configuration file, so that the device 100 enters the testing mode based on the configuration of the system configuration file after rebooting.

In a step 330, after the device 100 enters the testing mode, the program updating module 150 of the device 100 updates the library supporting the testing program 200 of the application 190. In this embodiment, in a condition that the program updating module 150 checks whether the version of the library of the application 190 installed in the device 100 supports the testing program 200, for example, the program updating module 150 obtains the version message of the library, and based on the version number recorded in the version message, the program updating module 150 determines whether the library supports the testing program. When the version of the library is too old to support the testing program 200, the program updating module 150 is connected to an external file server to download the library supporting the testing program 200 of the application 190, and performs MD5 check on the downloaded library; after the MD5 check is passed, the program updating module 150 updates the library of the application 190 by the downloaded library, and resets the device 100. The device can enter test mode again after reset.

In a step 340, when the program updating module 150 of the device 100 determines that the version of the library of the application 190 supports the testing program 200, the program updating module 150 stops executing, the program executing module 160 of the device 100 executes the application 190, and executes the testing program 200 in the application 190. In this embodiment, the program executing module 160 first determines whether the testing program 200 has been installed in the application 190 already, if not, the program executing module 160 installs the testing program 200 in the application 190; when the testing program 200 has been installed in the application 190, or the installation of the testing program 200 in the application 190 is completed, the program executing module 160 executes a launch instruction of the testing program 200, to execute the testing program 200 in the application 190.

In a step 360, after the testing program 200 is executed, the testing program 200 transmits a test instruction to a to-be-tested device 450 through the communication module 140 of the device 100, and obtains a test result generated by the to-be-tested device 450 executing the testing instruction. In this embodiment, FIG. 3B shows a flow of execution of the testing program 200; in a step 361, the instruction obtaining module 210 of the testing program 200 obtains the test instruction, the transmission module 240 of the testing program 200 sets up the secure channel with the to-be-tested device 450 and transmits the test instruction obtained by the instruction obtaining module 210 to the to-be-tested device 450 through the secure channel, and the to-be-tested device 450 executes the received test instruction inside a shell thereof. After the to-be-tested device 450 executes the test instruction completely, the to-be-tested device 450 transmits the generated test result to the transmission module 240 through the secure channel with the transmission module 240, the result display module 260 of the testing program 200 displays the test result in the form of webpage through the application 190.

In a step 363, after the to-be-tested device 450 executes the test instruction completely, when the generated data is a log not a test result, the to-be-tested device 450 transmits the generated log to the transmission module 240 of the testing program 200. In a step 367, the record analysis module 250 of the testing program 200 analyzes the log received by the transmission module 240, to obtain the test result of the to-be-tested device 450. Similarly, the result display module 260 of the testing program 200 displays the test result in the form of webpage through the application 190.

As a result, with the technical solution of the present invention, the tester just needs to adjust the system configuration file of the device 100 to enable the device 100 to enter the testing mode automatically to update the library of the application 190, so that the testing program 200 can be executed in the application 190 and the device 100 can perform the testing on the to-be-tested device 450 through the testing program.

Please refer to FIG. 3C. In the above-mentioned embodiment, when the to-be-tested device 450 does not enter the operating system after power on (such as the operating system has not been entered after the to-be-tested device 450 power on has passed the predetermined time), the tester can click the hot key displayed on screen of the device 100 according to the resource configuration file (such as file "rc.xml" under folder "/root/.config/" and file ".desktop" folder "./root.desktop/", etc.), and in a step 351, the instruction obtaining module 210 of the testing program 200 obtains the service instruction generated by the device 100. In a step 353, the instruction converting module 220 of the testing program 200 converts the service instruction obtained by the instruction obtaining module 210 to the operation instruction. For example, when the hot key clicked by the tester indicates to the fixture 410 releases or disengages the to-be-tested device 450, the instruction converting module 220 searches the device operating document corresponding to the generated service instruction, and reads the operation instruction for releasing or disengaging the to-be-tested device 450, from the device operating document.

In a step 355, after the instruction converting module 220 of the testing program 200 generates the operation instruction, the instruction obtaining module 210 of the testing program 200 obtains the control instruction, the transmission module 240 of the testing program 200 transmits the control instruction obtained by the instruction obtaining module 210 to the fixture 410, the fixture 410 transmits the status message back to the transmission module 240 after receiving the control instruction, so that the transmission module 240 obtains the status message transmitted from the fixture 410. Next, in a step 357, the status determining module 230 of the testing program 200 determines whether the status message received by the transmission module 240 matches the operation instruction generated by the instruction converting module 220, and if not, in a step 359, the transmission module 240 transmits the operation instruction to the fixture 410, so that the fixture 410 performs the operation corresponding to the received operation instruction on the to-be-tested device 450. For example, when the status message transmitted from the fixture 410 indicates that the fixture 410 is clamping the to-be-tested device 450, the status determining module 230 determines that the status message does not match the operation instruction for releasing or disengaging the to-be-tested device 450 from the fixture 410, so the transmission module 240 transmits the operation instruction to the fixture 410, to stop the fixture 410 from clamping the to-be-tested device 450 and control the fixture 410 to release or disengage the to-be-tested device 450.

According to above-mentioned contents, the difference between the present invention and the conventional technology is that, in the present invention, the system configuration file of an old testing device is modified to make the old testing device enter the testing mode when booting, so that library supporting the testing program of the application is updated in the testing mode; when the application is executed, the testing program is connected to the to-be-tested device to perform testing. With the above-mentioned solution, the present invention can solve the conventional problem of extra time cost to update the firmware of the old dedicated testing device with special hardware to reuse the old dedicated testing device can be solved, and the technical effect of reducing the time and labor cost for updating the old testing device can be achieved.

Furthermore, the method of updating library required by the testing program for testing of the present invention can be implemented by hardware, software or a combination thereof, and can be implemented in a computer system by a centralization manner, or by a distribution manner of different components distributed in several interconnect computer systems.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A method of updating library required by a testing program for testing, applicable to a controlling device and comprising:
   modifying a system configuration file of the controlling device;
   making the controlling device enter a testing mode based on the system configuration file when the controlling device is booted;
   updating library of an application in the controlling device in the testing mode;
   after the library is updated, executing a testing program in the application by the controlling device;
   obtaining a service instruction, and converting the service instruction to an operation instruction, by the testing program;
   transmitting a control instruction to a fixture, to obtain a status message of the fixture, by the testing program;
   when the testing program determines that the status message does not match the operation instruction, transmitting the operation instruction to the fixture, by the testing program, so as to enable the fixture to perform an operation corresponding to the operation instruction for the to-be-tested device; and
   transmitting a test instruction to the to-be-tested device, and obtaining a test result generated by the to-be-tested device executing the test instruction, by the testing program.

2. The method of updating library required by testing program for testing according to claim 1, wherein the step of converting the service instruction to the operation instruction by the testing program comprises:
   searching a device operating document corresponding to the service instruction, and reading the operation instruction from the device operating document, by the testing program.

3. The method of updating library required by testing program for testing according to claim 1, wherein the step of transmitting the test instruction to the to-be-tested device and obtaining the test result generated by the to-be-tested device executing the test instruction by the testing program, comprises:
   transmitting the test instruction to the to-be-tested device through a secure channel, to enable the to-be-tested device to execute the test instruction, by the testing program; and
   obtaining a log generated by the to-be-tested device, and analyzing the log to obtain the test result, by the testing program.

4. The method of updating library required by testing program for testing according to claim 1, the step of obtaining the service instruction by the testing program, further comprising:
   when the to-be-tested device does not launch an operating system successfully, obtaining the service instruction, by the testing program.

5. A device of updating library required by testing program for testing, comprising:
   a storage module, configured to store a system configuration file;
   a configuration modifying module, configured to modify the system configuration file;
   a system booting module, configured to boot the device based on the system configuration file, to make the device enter a testing mode;
   a program updating module, wherein when the device enters the testing mode, the program updating module is configured to update library of an application in the device; and
   a program executing module, configured to execute the testing program in the application, wherein the testing program transmits a test instruction to a to-be-tested device and obtains a test result generated by the to-be-tested device executing the test instruction, wherein the testing program obtains a service instruction, converts the service instruction to an operation instruction, and transmits a control instruction to a fixture for obtaining a status message of the fixture, wherein when the testing program determines that the status message does not match the operation instruction, the testing program transmits the operation instruction to a fixture, so as to enable the fixture to perform an operation corresponding to the operation instruction for the to-be-tested device.

6. The device of updating library required by testing program for testing according to claim 5, wherein the testing program searches a device operating document corresponding to the service instruction and reads the operation instruction from the device operating document for converting the service instruction to the operation instruction.

7. The device of updating library required by testing program for testing according to claim 5, wherein the testing program transmits the test instruction to the to-be-tested device through a secure channel, to enable the to-be-tested device to execute the test instruction, wherein the testing program obtains a log generated by the to-be-tested device, and analyzes the log to obtain the test result.

8. The device of updating library required by testing program for testing according to claim 5, wherein when the to-be-tested device does not launch an operating system, the testing program obtains the service instruction.

\* \* \* \* \*